United States Patent
Lermann

[15] 3,705,536
[45] Dec. 12, 1972

[54] CAMERA WITH EXPOSURE CONTROL USING A SINGLE MAGNET

[72] Inventor: Peter Lermann, Narring, Germany

[73] Assignee: AGFA-Gevaert Aktiengesellschaft, Leverkusen, Germany

[22] Filed: June 11, 1971

[21] Appl. No.: 152,267

[30] Foreign Application Priority Data

June 16, 1970 Germany..................P 20 29 784.1

[52] U.S. Cl.....................95/10 CT, 95/53 EB, 95/60
[51] Int. Cl.............................G03b 7/08, G03b 9/58
[58] Field of Search.....95/10 E, 10 CT, 53 E, 53 EA, 95/53 EB, 59, 60

[56] References Cited

UNITED STATES PATENTS

| | | | |
|---|---|---|---|
| 3,466,993 | 11/1966 | Fahlenberg et al.................95/53 EB |
| 3,429,244 | 2/1969 | Von Wasielewski...............95/10 CT |

FOREIGN PATENTS OR APPLICATIONS

| | | | |
|---|---|---|---|
| 1,102,231 | 2/1968 | Great Britain.....................95/53 EB |
| 1,095,843 | 12/1967 | Great Britain.....................95/10 CT |

*Primary Examiner*—Joseph F. Peters, Jr.
*Attorney*—Michael S. Striker

[57] ABSTRACT

Activation of a release button starts movement of a control slider along a predetermined path. The start of the slider motion activates a timing circuit furnishing a signal after a fixed time interval, and energizes the magnet. The slider motion is stopped mechanically and resumes only after deenergization of the magnet at the end of the fixed time interval. The magnet is reenergized, the opening blade is pivoted to its exposure position, and an exposure timing circuit activated. After proper exposure, the magnet is deenergized, allowing the shutter closing blade to terminate the exposure.

16 Claims, 2 Drawing Figures

INVENTOR
PETER LERMANN

CAMERA WITH EXPOSURE CONTROL USING A SINGLE MAGNET

BACKGROUND OF THE INVENTION

This invention relates to photographic cameras. More particularly, it relates to photographic cameras having a first electronic circuit furnishing a timing output signifying a fixed time interval and, subsequently thereto, additional circuitry for furnishing a timing output during the exposure time interval. The photographic camera in accordance with this invention has shutter opening and shutter closing means.

Such cameras are known. In the known cameras of this type, a separate magnet is connected with the first and second timing circuit.

SUMMARY OF THE INVENTION

It is an object of the present invention to furnish a photographic camera of the above-described type wherein less equipment is used, less space is required and the current consumption is decreased.

In accordance with this invention, this is achieved by utilizing a single magnet to replace the previously used two magnets.

Specifically, this invention comprises a photographic camera having shutter closing means which has a first and second closing position. The camera further has shutter opening means which has a first and second opening means position and move from said first to said second opening means position in response to opening means activation. The shutter opening means further has means retaining the shutter closing means in the first closing means position when the shutter opening means is in the first opening means position. The camera further comprises timing means for timing a first and second timing interval and furnishing a timing output during said first and second timing interval. Transducer means has a transducer output element and a transducer input. The transducer input is connected to said timing means in such a manner that the transducer output element is retained in a first transducer position during said first and second timing interval. The transducer output element has associated retaining means for retaining the shutter closing means in the first closing means position when said transducer output element is in said first transducer position. Further provided are switching means connected with said timing means for initiating said first and second timing interval upon first and second switch activation respectively. Finally, a control element moves from a start position along a predetermined path upon manual release. The control elements have first associated control means furnishing said first switch activation during said movement from said start position, second associated control means cooperating with said retaining means to prevent movement of said control element during said first timing interval, and third associated control means for furnishing said second switch activation and said opening means activation during movement along said predetermined path following said first timing interval.

In the above, the second switch activation is furnished just prior to the shutter opening means activation, thereby energizing the magnet and causing the retaining means associated with the magnet to hold the shutter closing means in the first closing means position. At the expiration of the exposure time, the magnet is again de-energized freeing the shutter closing means to move into the second closing means position closing the shutter.

In a preferred embodiment of the present invention, the shutter opening means is retained in the first opening means position by a opening lever means which may be moved away from a projecting pin in the shutter opening means by a projection associated with the control element which, in a preferred embodiment, is a control slider. A spring associated with the shutter closing means tends to force the shutter closing means into the second position closing the shutter. This force is counteracted by a pin in the shutter opening means when said shutter opening means is in the first opening means position.

The extension of the control element which opens the shutter opening means, is suitably shaped on the side away from the opening lever that it causes the return of the shutter opening means and of the shutter closing means to the first opening and closing means position respectively when returning along said predetermined path to the start position.

The retaining means may be a pivotally mounted lever which have a shape designed to embrace a pin on the shutter closing means when the lever is in the position determined by the armature position while the magnet is energized.

Pivoting of the retaining lever may be accomplished by an extension of the armature lever. Further, the retaining lever may be pushed against the armature lever by means of a spring.

The control element may have a U-shape whereby the armature lever may be pushed into the first transducer output position (the position corresponding to an energized magnet) which is the position it assumes during the two timing intervals.

The control element actually has three rest positions. While the control element in the first or start position, it is retained by the release button. At this time the armature lever is held by the first leg of the U in its first position. Movement from the first to the second rest position causes energization of the magnet via a first switch activation. In the second rest position of the control element, its movement is stopped by the retaining lever. Further, in this position, the bottom of the U is opposite the retaining lever projection allowing movement of said retaining lever upon de-energization of the magnet. The movement (pivoting) of the retaining lever upon de-energization of the magnet at the end of the first, fixed time interval allows the control element to proceed to the third rest position, the shutter closing means being retained in the first closing means position by the shutter opening means. The movement of the control element again activates the switching means initiating the second or exposure time interval. The magnet is therefore again energized causing the retaining lever to retain the shutter closing means in the first closing means position. Further movement of the control element causes the shutter to open, since the retaining spring is removed from the shutter opening means. It should also be noted that during this movement towards the end position of the control element the second leg of the U causes the magnet armature to be pushed back into the initial position. It is noted that the armature is pushed into the position that it assumes during the two timing intervals just prior to said timing intervals. The energization of the magnet then serves to retain the armature in the position it has assumed. Thus the magnet is not required to supply full power to counteract the force of the spring which tends to move the armature in the direction away from the magnet. A stronger spring can thus be used for this purpose which in turn causes the armature to move promptly upon deenergization of the magnet.

While the control element has been shown here to be a slider, a ring-shaped arrangement could be used equally well. Any type of cam is suitable for this purpose.

The timing circuit used herein has an output circuit which is a bistable circuit such as a Schmitt trigger. These circuits are in themselves well known in the art. Such a circuit, used in conjunction with the timing circuit similar to the present one may for example be found in U.S. Pat. No. 3,429,244.

The novel features which are considered as characteristic for the invention are set forth in particular in the appended claims.

The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
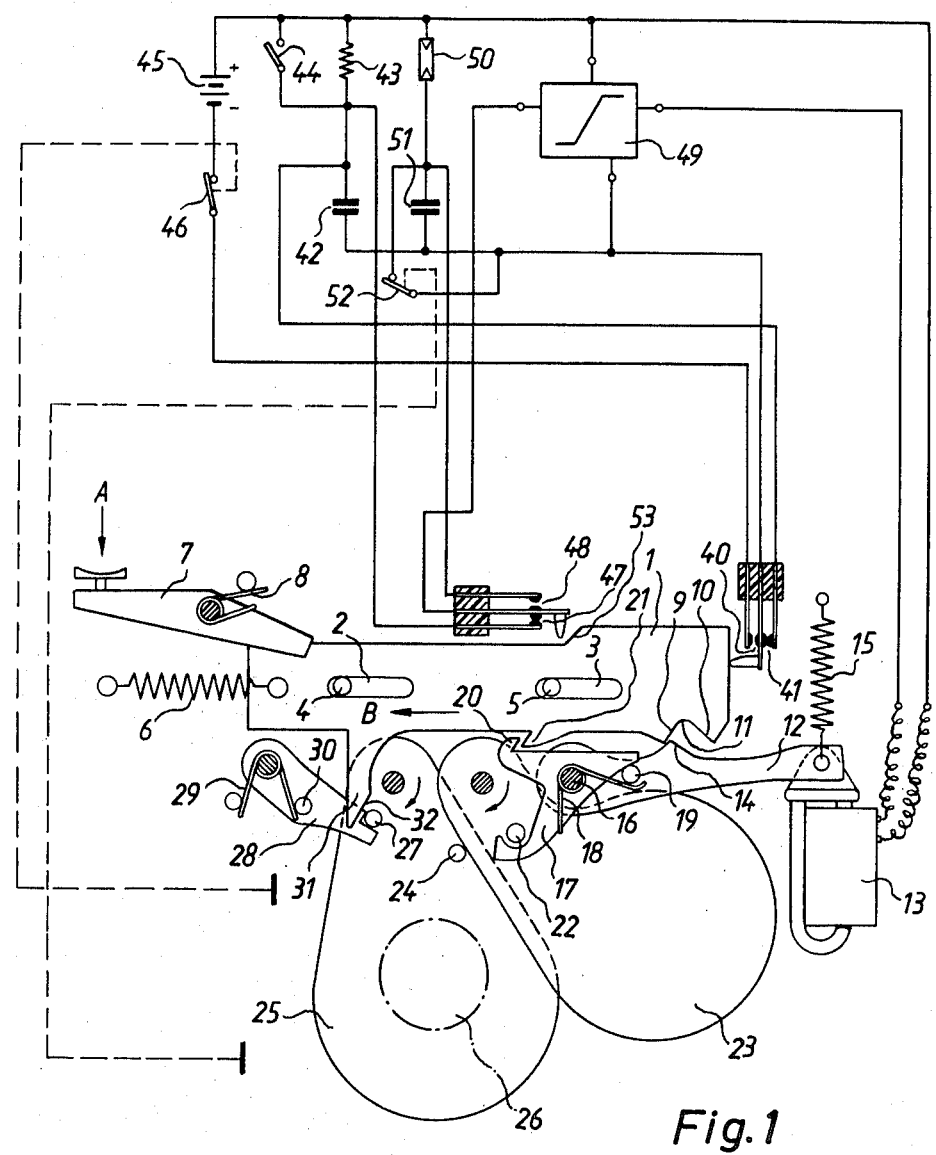
FIG. 1 shows an embodiment of the present invention using two timing capacitors.

The preferred embodiment of the present invention will now be described with reference to the drawing.

It should first be noted that the same or corresponding elements in the two Figures have the same reference numerals. Referring first to FIG. 1, reference numeral 1 denotes the control element, namely a slider. This slider has two lengthwise slits labelled 2 and 3 respectively. Pins 4 and 5 engaging these slits control the motion of the slider along the predetermined path. The slider is connected to a spring 6 which is a tension spring. Further, slider 1 is retained in its start (cocked) position by means of a release lever 7 which cooperates with a spring 8. The extremity of the control slider remote from spring 6 has a U-shaped section having legs 9 and 10, the bottom of the U forming an opening between said legs. When the control slider is in the position shown in FIG. 1, leg 9 pushes an armature lever 12 against the magnet (designated 13), that is, the armature lever 12 has a projection 14 which makes contact with leg or projection 9. A tension spring 15 is connected to armature lever 12. The lever 12 is mounted for pivoting around axis 16. The retaining lever 17 is pivotally mounted on the same axis and is further pressed against a pin 19 in armature lever 12 by means of a spring 18. The retaining lever has a further projection 20 which, in the position shown, projects into the path travelled by slider 1 and serves to stop the slider from moving when it encounters projection 21 on said slider.

Retaining lever 17 further has an end shaped for embracing a pin 22 which is part of the shutter closing means, namely the closing blade 23.

Shutter opening means, namely a blade 25 is mounted adjacent to the closing blade 23. Reference numeral 26 denotes the opening for the objective. On the side of opening blade 25 adjacent to closing blade 23 is a pin 24 which serves to retain the closing blade in the first closing means position when the opening blade is in its initial position.

The opening blade 25 further has a pin or projecting element 27 against which an opening lever 28 is pushed by action of a spring 29. Opening lever 28 further has a pin 30 which is arranged in the path of a projection 31 of control element 1. The projection 31 is referred to herein as third associated control means and has a slanted side labeled 32 opposite to the side making contact with pin 30.

A double throw switch has a movable arm resting against the extremity of control slider 1 which is remote from spring 6. When the control element is in its start position, a pair of contacts 41 of said switch is closed causing a capacitor 42 which is part of timing means to be short circuited. Capacitor 42 has a second terminal connected in series with a resistance 43 whose other terminal is connected to the positive side of battery 45. A switch 44 short circuits resistance 43 when closed. A normally closed contact 46 is connected in series with the negative side of battery 45 and serves to disconnect said battery after the exposure process has been completed.

Second switching means having a movable arm has a contact pair 47 which when closed as in the Figure, causes the common point of capacitor 42 and resistor 43 to be connected to the input of output circuit means 49 which is a threshold circuit. The coil of magnet 13 is connected to the output of bistable or threshold circuit means 49.

A second timing circuit comprising a photoresistance 50 connected in series with a capacitor 51 is connected in parallel with the above-described first timing circuit comprising resistor 43 and capacitor 42. It is the second timing circuit which times the exposure timing interval herein also referred to as the second timing interval. Capacitor 51 is shortcircuited by a contact 52. When the previously described second switching means is in the second position wherein a pair of contacts 48 is closed, the common point of photoresistance 50 and capacitor 51 is connected to the input of output stage 49. The second switching means which also has a movable arm alternately closing contacts 47 or 48 is activated by an extension 53 of control element 1, said extension forming part of the third associated control means.

The above-described arrangement operates as follows: Upon activation of the release button A in the direction of the arrow, the control element 1 is free to move in the direction of arrow B. Immediately at the start of this movement, the first associated control means namely the side of slider 1 remote from spring 6 causes contacts 41 to open and contacts 40 to close thereby removing the short-circuit from capacitor 42 and causing battery 45 to be connected to the timing means via contacts 40. Capacitor 42 begins to charge through resistance 43. Magnet 13 is immediately energized following the closing of contacts 40.

Movement of slider 1 is immediately stopped by the second associated control means, namely extension 21 which meets extension 20 of retaining lever 17. This is the second rest position of the slider and in this position the bottom of the U 11 is opposite projection 14 of armature lever 12. After a time which depends upon the values of resistance 43 and capacitor 42 the threshold of stage 49 is passed and stage 49 flips to its alternate stage de-energizing the coil of magnet 13. Spring 15 acts to move armature 12 away from magnet 13. This causes the retaining lever 17 to pivot around axis 16 thereby freeing projection 21 and allowing the control element to resume movement along its predetermined path.

During this movement, the projection 53 activates the second switching means causing contacts 47 to open and contacts 48 to close. Now, the timing circuit having the photoresistance is connected to the input of stage 49, thus starting the exposure time interval. Further, leg 10 of the U-shaped section of the control element pushes extension 14 of the armature lever down, causing the armature to move towards the magnet, that is in opposition to the pull of spring 15. As soon as contacts 48 close, the magnet is reenergized.

It should be noted here that during the previously mentioned pivoting of retaining lever 17, which freed the control element for further motion, the closing blade 23 was temporarily released by the retaining lever. However, the closing blade remained in its first position since pin 24 of the opening blade was in proper position to retain it there. Continued travel of the control slider finally brings extension 31, also part of the third associated control means, in contact with pin 30 of opening lever 28. This causes the opening lever to pivot, freeing opening blade 25 for movement to its second position, wherein exposure of the film takes place. This movement is effected by a spring which is not shown in FIG. 1.

Figure 2:
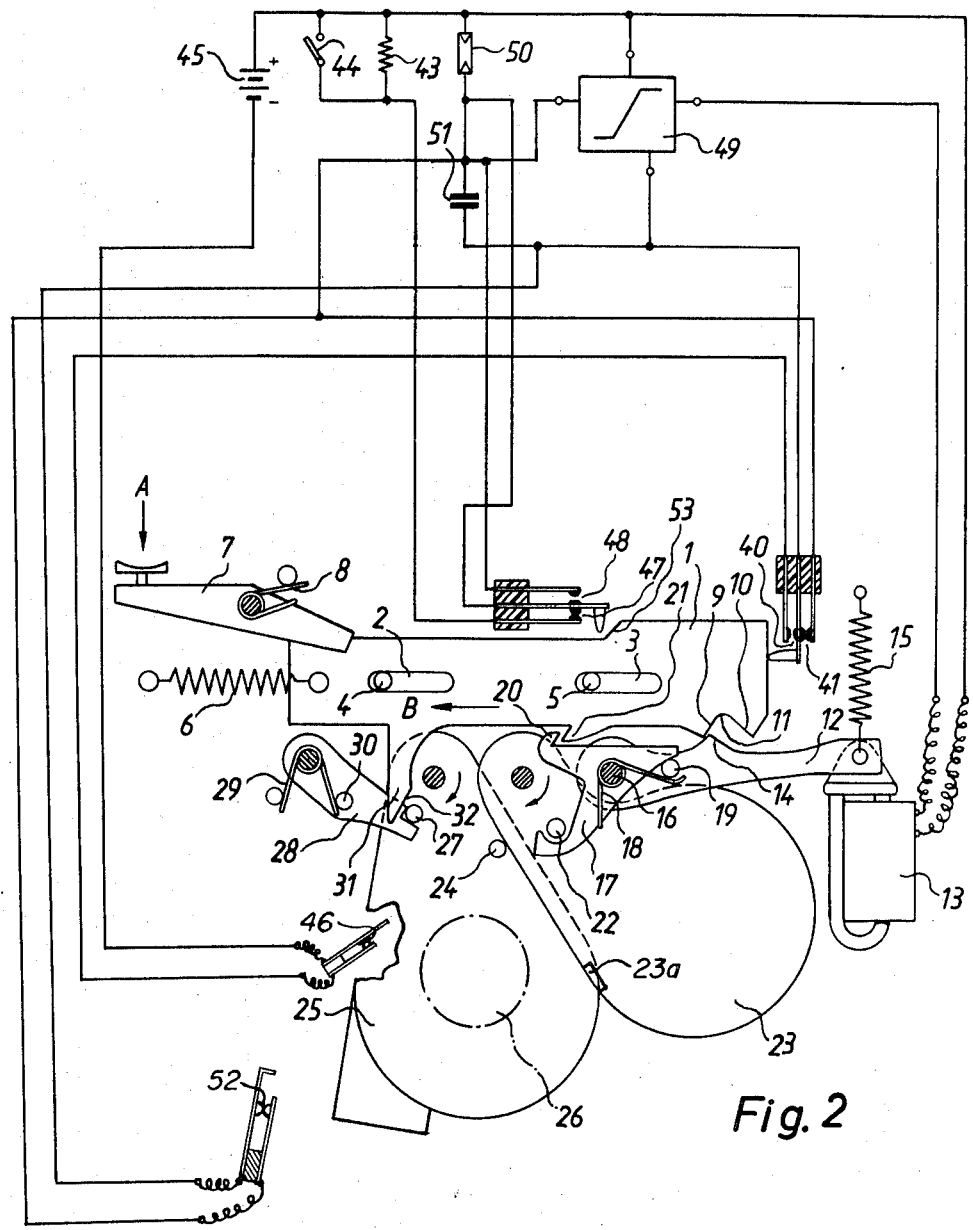
FIG. 2 shows an embodiment of the present invention using a single timing capacitor.

During movement of opening blade 25, or immediately following said movement, contact 52 is opened by a projection 25a on opening blade 25, as shown in detain in FIG. 2, and as indicated schematically by the dashed lines terminated at said contact in FIG. 1, allowing capacitor 51 to start charging through photoresistance 50. After an exposure time interval depending upon the amount of available light impinging upon photoresistance 50, the threshold voltage of stage 49 is again passed and magnet 13 is deenergized. Lever 12 again pivots around axis 16 under action of spring 15. Retaining lever 17 is also pivoted around axis 16 as a result of the presence of pin 19, causing pin 22 of the shutter closing blade 23 to be freed, causing blade 23 to move to the position wherein the exposure of the film is terminated. Movement of blade 23 also takes place under the action of a spring which is not shown. After the whole exposure cycle has been completed, contact 46 is opened, disconnecting battery 45 from the circuit.

Slider 1 is cocked by moving same in the direction opposite to arrow B. This is accomplished by the same lever which moves the film and cocks the shutter. The latter lever is operated by the user of the camera. While the slider is being moved in the direction opposite to arrow B, the slanted surface 32 of extension 31 pushes pin 27 of the opening blade, causing the latter to return to the first opening means position. The closing blade 23 is simultaneously returned to its closing position due to action of pin 24. Further, leg 9 of the control element pushes the armature lever 12 in conjunction with retaining lever 17 back into their initial position. When slider 1 has reached its start position, release lever 7 moves into a recess in said slider under action of spring 8, thereby retaining said slider in the start position. In this position the first associated control means close contacts 41 of the first switching means, while contacts 40 of said switching means are opened. Battery 45 is thereby removed from the circuit, allowing contacts 46 to be closed. All remaining contacts are then back in the position shown in FIG. 1 and ready for the next exposure.

FIG. 2 shows a second embodiment of the present invention, which is very similar to the embodiment shown in FIG. 1, but wherein only one capacitor is used in the timing circuit. Specifically, a single capacitor 51 replaces capacitors 51 and 42. One terminal of capacitor 51 is directly connected to the input of stage 49. The other terminal of capacitor 51 is disconnected from photoresistance 50 when the second switching means is in the initial position wherein contacts 47 are closed and is connected to photoresistance 50 when the switching means is in the second position wherein contacts 48 are closed. During closure of contacts 47, the same terminal of the capacitor is connected to fixed resistance 43. Capacitor 51 is short circuited by contacts 41 when slider 1 is in the start position. The short-circuit is removed immediately upon movement of slider 1. After the first timing interval determined by resistance 43 and capacitor 51, opening blade 25 moves to its second position, short-circuiting capacitor 51 via contact 52 during said movement, thereby discharging said capacitor. When opening blade 25 reaches its position wherein exposure is started, the short-circuit is removed and the exposure timing interval begins.

FIG. 2 also indicates one method of operating switch 46, which is also shown in FIG. 1. The switch may be operated by an extension 23a which is part of closing blade 23 and which is mounted to operate switch 46 when the closing blade is in position terminating the exposure. Contact 46 is arranged above the plane of blade 23. The contact is closed again when closing blade 23 returns to its initial position.

Although the preferred embodiments shown in the Figures have shown specific types of timing circuits, the present invention is of course independent of the type of timing circuits used. It is the heart of the present invention that a single magnet is used for effecting both the shutter opening and shutter closing in a two blade arrangement. Further, as stated above, other types of cams can replace slider 1 and other types of magnet 13.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is:

1. Photographic camera, comprising, in combination, shutter closing means having a first and second closing means position; shutter opening means moving from a first opening means position to a second opening means position in response to opening means activation, said shutter opening means having means retaining said shutter closing means in said first closing means position when in said first opening means position; timing means for timing a first and second time interval and furnishing a timing output during said first and second timing intervals; transducer means having a transducer output element and a transducer input connected to said timing means in such a manner that said transducer output element is retained in a first transducer position during said first and second timing intervals, said transducer output element having associated retaining means for retaining said shutter closing means in said first closing means position when said transducer output element is in said first transducer position; switching means connected with said timing means for initiating said first and second timing interval upon a first and second switch activation respectively; and a control element moving from a start position along a predetermined path upon manual release, said control element having first associated control means furnishing said first switch activation, second associated control means cooperating with said retaining means to prevent movement of said control element during said first timing interval, and third associated control means for furnishing said second switch activation and said opening means activation during movement along said predetermined path following said first timing interval.

2. A photographic camera as set forth in claim 1 wherein said timing means comprise capacitor means; fixed resistance means connectable to said capacitor means for furnishing said first time interval; and photoresistance means connectable to said capacitor means for furnishing said second time interval.

3. A photographic camera as set forth in claim 2 further comprising opening lever means retaining said shutter opening means in said first opening means position; and wherein said third associated control means moves said operating lever means away from said shutter opening means, thereby releasing said shutter opening means to move from said first to said second opening means position.

4. A photographic camera as set forth in claim 3, wherein said shutter opening means comprise a first projecting element; further comprising first spring means for holding said opening lever means in contact with said first projecting element.

5. A photographic camera as set forth in claim 4, further comprising means for moving said control element back along said predetermined path to said start position; wherein said third associated control means comprise first extension means associated with said control element; and wherein said first extension means return said shutter opening means and said shutter closing means to said first closing and opening means position respectively during said movement along said predetermined path back to said start position.

6. A photographic camera as set forth in claim 5 wherein said transducer means comprise magnet means having a coil connected to the output of said timing means, an armature moving in response to current in said coil, and transducer lever means connected to said armature in such a manner that movement of said armature causes movement of said transducer lever means.

7. A photographic camera as set forth in claim 6, wherein said second associated control means of said control element comprise a first control projection; and wherein said retaining means comprise pivotally mounted retaining lever means coupled to said transducer lever means and having a first retaining lever projection extending into said predetermined path of said control element when said armature lever means is in said first transducer position.

8. A photographic cameras as set forth in claim 7, wherein said shutter closing means comprise a closing projecting element; and wherein said retaining lever means embrace said closing projecting element when said transducer lever means is in said first transducer position.

9. A photographic camera as set forth in claim 8, wherein said transducer lever means comprise a magnet lever projection; and wherein said retaining lever means is mounted for pivoting in response to movement of said magnet lever projection.

10. A photographic camera as set forth in claim 9, further comprising retaining spring means mounted to retain said retaining lever means in contact with said magnet lever projection.

11. A photographic camera as set forth in claim 10, further comprising magnet spring means connected to said armature for moving said armature from said first transducer position to a second transducer position when said coil is de-energized; and wherein said control element has a substantially U-shaped section, said U-shaped section having a first and second leg for moving said transducer lever means and thereby said armature from said second transducer position to said first transducer position at the start of said first and second timing intervals.

12. A photographic camera as set forth in claim 11, wherein said control element is a slider.

13. A photographic camera as set forth in claim 12, further comprising a source of electrical energy; wherein said timing means further comprise output circuit means connecting said coil to said source of electrical energy when in a first state and disconnecting said coil from said source of electrical energy when in a second state, said output circuit means having an input connected to said capacitor means; and wherein said switching means comprise first switching means interconnected between said source of electrical energy and said timing means and mounted relative to said slider in such a manner that movement of said slider from said start position results in connection of said source of electrical energy to said timing means.

14. A photographic camera as set forth in claim 13, wherein said output circuit means comprise bistable circuit means switching from said first to said second state when said voltage on said capacitor means exceeds said predetermined voltage, thereby completing said first timing interval.

15. A photographic camera as set forth in claim 14, wherein said switch means further comprise second switching means interconnected between said photoresistance means and said capacitor means and said input of said bistable circuit means and mounted relative to said slider in such a manner that movement of said slider along said predetermined path following said first timing interval connects said photoresistance means and said capacitor means to said input of said bistable circuit means in such a manner that said voltage on said capacitor means is a function of light falling on said photoresistance means and further in such a manner that said bistable circuit means are responsive to said voltage on said capacitor means, whereby said second timing interval constitutes the required expose time.

16. A photographic camera as set forth in claim 15, wherein said bistable circuit means comprise a Schmitt trigger.

* * * * *